United States Patent Office 2,852,868
Patented Sept. 23, 1958

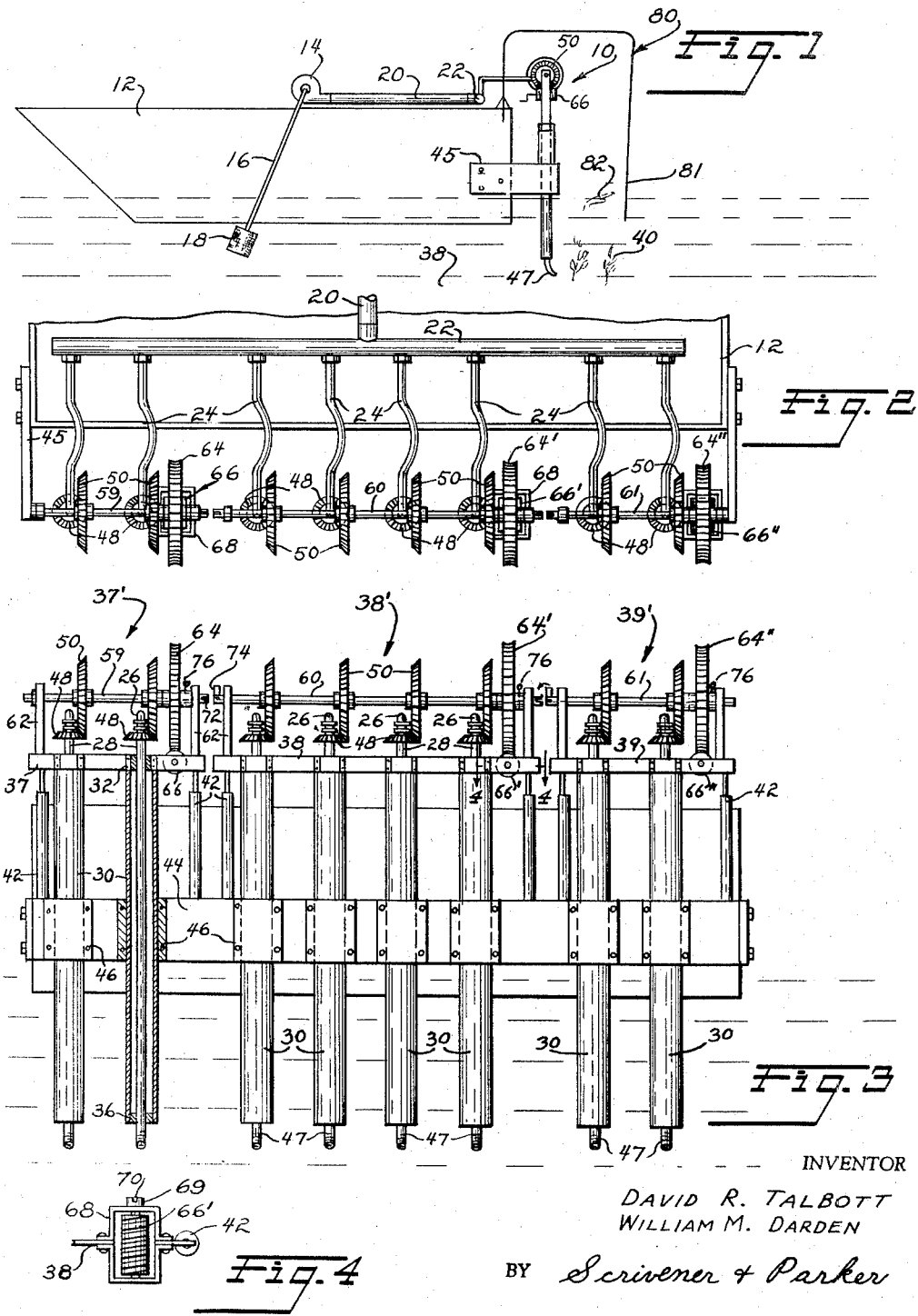

2,852,868

APPARATUS FOR REMOVING MATTER FROM THE BOTTOM OF WATERWAYS

David R. Talbott and William M. Darden, Annapolis, Md.

Application January 14, 1957, Serial No. 633,928

4 Claims. (Cl. 37—78)

This invention relates to apparatus for removing seaweed or other matter from the bottom of waterways and more particularly to apparatus which removes bottom matter by the use of hydro-jets.

One object of the present invention is the provision of a water-borne jet apparatus for freeing and removing aquatic plants such as seaweed from the bottom of shallow waterways, particularly along shore lines.

Another object of the invention is the provision of apparatus for accomplishing the above which depends for its operation on the use of a plurality of jets for jetting away bottom mud or sand from around the roots or anchoring appendages of aquatic plants to enable the plants to float to the surface and be thereafter towed away to a place of disposal.

Still another object of the invention is the provision of apparatus of the above nature wherein the jets serve not only to free the aquatic plants but also serve as the means for propelling and steering the barge or the like which bears the apparatus.

Still another object of the invention is the provision of apparatus which served not only to remove aquatic plants and the like but also serves to clear channels of silt and debris collected therein.

Other objects and their attendant advantages will become apparent as the following detailed description is read in conjunction with the accompanying drawings wherein:

Fig. 1 is a schematic side elevation of the apparatus of the present invention showing the parts in the position they assume while in use;

Fig. 2 is a partial enlarged top plan view of the jetting apparatus of the invention;

Fig. 3 is an enlarged rear view, partly in section and partly in elevation, of the apparatus of the present invention; and Fig. 4 is an enlarged detail view taken substantially on the line 4—4 of Fig. 3.

Referring now to the drawings and particularly to Fig. 1, the jet apparatus of the present invention, indicated generally at 10, is mounted on the rear of a shallow draft barge 12 which is propelled over the bottom by the jets of the invention in a manner that will become apparent. Mounted on the barge is a conventional power driven pump, shown schematically at 14, which receives water via a trailing intake line 16 provided with the usual filter 18. From the pump 14 water is impelled rearwardly via an outlet line 20 to an athwartship manifold 22 more clearly shown in Fig. 2. Connected at spaced intervals to the manifold 22 are the inner ends of a plurality of rearwardly extending flexible conduits 24 whose outer ends are connected to conventional pivotal couplings 26 which may be of the type shown in the patent to Lovett, No. 967,757 and which serve to join the conduits with vertical jet pipes 28 projecting downwardly from the rear of the barge 12 through coaxial relatively fixed outer pipes 30 which provide at their upper and lower ends 32, 36 (Fig. 3) bearing supports for the pipes 28. The outer pipes 30 are attached at their upper ends to transverse frame members 37, 38, and 39, each of which preferably carries two or more of the pipes 30, with their enclosed jet pipes 28, thus providing laterally disposed separate banks of jets, each respectively designated by the numerals 37', 38' and 39'. Inasmuch as each of these banks includes substantially identical parts, like reference characters are applied to identical parts and the description of such parts as applied to one bank will suffice for each of the other banks. Referring to bank 37', for example, its frame member 37 is supported at its ends by elevating means which may comprise hydraulic actuators 42 whose cylinders are fixed to a stationary frame member 44 which is connected to the barge by side frames 45 as illustrated in Fig. 1. The frame 44 provides sliding supports for the pipes 30 which are slidably connected to the frame 44 by collars 46 which may be riveted or otherwise attached to the frame 44 to permit the pipe 30, and hence the jets 28, to be elevated with respect to the frame when the actuators 42 are extended.

As illustrated in Fig. 1, the jet pipes 28 are provided at their lower ends with downwardly slating orifice tips or outlets 47 which project the jet stream in any direction diagonally downwardly depending on the rotation of the jet pipes 28 within the outer pipes 30. The pivotal couplings 26 permit the continuous supply of water under pressure to the pipes 28 during rotation thereof and one means for accomplishing such rotation is illustrated in the drawings. Each of the banks 37', 38' and 39' is provided respectively with a transverse drive-shaft 59, 60 and 61, and since the rotating driving means of each bank includes identical parts, hereinafter identical reference characters will be applied to such identical parts and the description of such parts as applied to one bank will suffice for the other banks. Referring to bank 37', each vertical jet pipe of that bank, as is each of the pipes of the other banks, is operatively connected to shaft 59 by a bevel gear 48 meshing with a drive gear 50 fixed to the shaft 59 which is rotatably supported at its opposite ends by identical bearing frames 62 carried by the elevatable frame member 37. It will be apparent to those skilled in the art that the shafts 59, 60 and 61 of each bank, and hence the gears 50, 48, and jet pipes 28, can be rotated in any of a variety of ways, an exemplary means being illustrated as comprising worm wheels 64, 64' and 64" respectively carried on the shafts 59, 60, and 61 of the respective banks of jets 37', 38' and 39'. Each of the worm-wheels 64, 64' and 64" is engaged by a worm 66, 66' and 66" whose opposite ends are arranged in frames at one end of each of the elevatable members 37, 38 and 39 as more particularly shown in Fig. 4 where the worm mounting means for bank 38' is illustrated. Inasmuch as the mounting means for each bank is identical to that of bank 38', a description of Fig. 4 suffices for all. As illustrated, the worm 66' is mounted in a frame 68 with its axle 69 projecting through the forward end of the frame and is provided with a crank engageable slot 70 whereby, when a suitable manually operable crank is engaged with the slot, rotation of the former drives the worm to turn its worm-wheel 64' and hence its shaft 60 to rotate all the jet pipes 28 of bank 38'. Rotation may be imparted to the shafts 59 and 61 of banks 37' and 39' in an identical fashion with identical mechanism.

It should be understood that with each bank being provided with a worm drive, the jets of any bank are independently rotatable with respect to the other banks. In the event that it is desirable to rotate all of the jets of all the banks simultaneously it will be observed that this can be readily done by adjusting the actuators 42 of each bank so that all the shafts 59, 60, 61 of all the banks are in axial alignment. By the provision of slots 72 on the end of shaft 59 for example, engageable by a latch 74 pivoted on the adjacent end of the shaft 60 it will be seen that these shafts may be locked together for simultaneous rotation as can the shafts 60 and 61 so that the shafts 59, 60 and 61 form, in effect, a continuous athwartship shaft by which all the jet pipes may be rotated simultaneously. Since a worm drive is an irreversible drive, a manually removable locking pin 76 is provided in the collar of each worm wheel so that those not employed in driving the connected shafts 59, 60, 61 may be idled by merely removing the pins. With the shafts thus locked and the non-employed worm wheels idled, it will be apparent that the shafts 59, 60, 61 may be rotated from any one cranking station convenient to the operator. It should also be observed that by providing a plurality of slots 72 in the shaft ends, these shafts may be first angularly oriented with respect to the adjacent shaft before the latch 74 is engaged. Thus one bank of jets may be made to precede or follow the adjacent bank of jets to thereby control excessive zigzagging of the barge which might result if all jets were to be rotated in synchronysm. Under some circumstances it might be desirable for one or more banks of jets to be trained in a stationary position, say aft, for the purpose of propelling the barge forwardly by the action of the trained-aft jets. Under these circumstances, the latches 74 would be merely disengaged from the adjacent slots and the selected bank or banks could be rotated or remain stationary as the situation demanded. It should of course be apparent that only one bank need be provided with a manual drive as for example only the center bank 38' with the outboard banks 37', 39' being driven only when the shafts 59, 60, 61 are in alignment and when it is found desirable by the operator to rotate all the jets simultaneously.

Independent elevation of the banks is provided in order that each bank may be separately adjusted for the depth of water. This is particularly desirable when weed is to be removed from a bottom which falls off steeply from the shore line and the barge is to traverse the area parallel to the beach. The bank of jets nearest the beach say bank 37' would be set at a shallow depth with banks 38' and 39' each bank being set successively deeper to conform with the contour of the bottom. Under these circumstances it will of course be apparent that each bank would require independent rotation if this were found to be necessary.

From the foregoing it will be apparent that with the jet orifices projecting the jet stream in a diagonal downward direction, a reaction thrust is exerted on the barge in a direction parallel to the water surface. The jet stream serves to wash away mud or sand from the bottom in which aquatic plants may be anchored so that these may then float to the surface. The reaction thrust exerted by the jet-stream is the means employed for propelling and steering the barge with the rate of propulsion being variable from a maximum speed obtained when all jets are trained aft and discharging at full capacity to any variable lesser speed which may be obtained, either by decreasing pump output or by training one or more banks of jets in a direction opposing the forward thrust of the remainder of the jets. For steering the barge it will be apparent that this may be done by means of the rotating crank engaged with any of the worm drives to train the appropriate jets to one side or the other to create substantially the same steering effects as a propeller-driven outboard motor.

The present invention is not only adapted for dislodging aquatic weed but it is also particularly well adapted for desilting channels which become filled and unnavigable, particularly where tidal tributaries are joined with a larger body of tidal water through a narrow passage. Under these circumstances, the passage may be swept to a navigable depth by making successive passes through the passage with the central bank of jets 38' being lowered appropriately on each pass and with the outboard banks 37', 39' being trained outwardly at an angle. With this arrangement, the central bank jets the silt into suspension and the outer jets produce a flow to the side of the passage to which the suspended silt is projected. The manner of operating the jets would of course vary depending on conditions.

In the removal of weed, the jets are adjusted with respect to the bottom so that a stream is projected with sufficient energy at the anchoring tendrils of the weed to wash away the mud in which the ends of the tendrils are embedded, with the jets being rotated as desired. Preferably this would be done when the weed is quite small and upon being freed from the mud the weed floats to the surface. In order to remove the weed, the barge may be equipped with a suitable overhanging rake device 80 schematically shown in Fig. 1 having tines 81 which would project beneath the surface of the water. The rake device is not illustrated in detail since it should be apparent to those skilled in the art that it could be of any suitable construction. For example, the tines 81 could merely comprise a plurality of spaced vertical rods depending from a transverse horizontal rod similar to the rake shown in the patent to Ketcham, No. 132,668, suitably rigged by a boom or otherwise supported over the rear of the barge. The dislodged weed, as indicated at 82 in Fig. 1, would float into the enclosed area formed between the stern of the barge and the tines and when this area was sufficiently filled the dislodged weed would be dragged to a place of disposal.

When removing quite thick weed growth which might become entangled with the pipes 30 containing the jet pipes 28, such weed would be periodically removed from the pipes 30 by the operator merely extending the actuators 42 to elevate the jet mechanism and scrape the weed clear of the pipes 30 as these slide upwardly through the collars 46 on the relatively stationary frame member 44.

From the foregoing it is believed that the operation of the apparatus of the invention should be apparent and that no further description should be required. It should be understood that the mechanism employed for actuating the apparatus, such as, for example, the means for rotating the jets and the means for elevating the jets, is exemplary only and that any one of a vast number of mechanisms could be employed for producing the described effects in conjunction with jets arranged in accordance with the invention for dislodging sea plants, de-silting channels, and propelling and steering the barge which bears the apparatus. It will of course be apparent that each conduit leading to the separate jet pipes could be provided with valve means and any number of banks of jets could be employed with as many jets provided in each bank as convenient. Various other changes and modifications in the invention will be apparent to those skilled in the art and such changes and modifications are included within the purview of the invention without, however, departing from the scope and spirit of the appended claims.

What is claimed is:

1. Apparatus for dislodging mud, silt and the like from the bottom of waterways comprising a barge of shallow draft, a stationary frame connected to the rear of said barge, a vertically movable frame, elevating means connecting said stationary and said movable frames, a plurality of vertical pipes fixed to said movable frames and having slidable connections with said fixed frame, a plurality of jet pipes rotatably enclosed in said first named pipes and having slanting outlets extending below said pipes for projecting a jet stream angularly against said bottom, a plurality of flexible conduits including a pivotal coupling connected to each of said jet pipes, a pump on said barge for delivering water under pressure through said conduits to said vertical jet pipes, and means for rotating each of said jet pipes within said outer pipes simultaneously and to the same degree in all directions.

2. Apparatus for dislodging mud silt and the like from the bottom of waterways comprising a shallow draft barge, a plurality of side-by-side independent banks of vertical jet pipes mounted on the rear of said barge and having downwardly slanting outlet orifices, a pump on said barge for supplying water under pressure to said jet pipes, means for vertically adjusting each bank of jet pipes independently of the other banks so as to locate said orifices in close adjacency to said bottom to conform to the contour thereof, and means for simultaneously rotating about their vertical axes the jet pipes of each bank independently of the jet pipes of other banks.

3. The apparatus of claim 2 wherein each of said jet pipes is rotatably enclosed within an outer pipe.

4. Apparatus for dislodging mud, silt and the like from the bottom of waterways comprising a shallow draft barge, a stationary frame connected to the rear of said barge, a plurality of side-by-side movable frames, elevating means independently connecting each of said movable frames to said fixed frame, a plurality of vertical pipes fixed to each of said movable frames, collars having a sliding fit with each of said pipes connecting the same to said fixed frame, a jet pipe rotatably enclosed in each of said first named pipes and having slanting outlets extending below said pipes for projecting a jet stream angularly against said bottom, a plurality of flexible conduits including a pivotal coupling connected to each of said jet pipes, a pump on said barge for delivering water under pressure through said conduits to said jet pipes, a transverse shaft rotatably carried by each of said movable frames, and operatively connected to each of said jet pipes connected to each frame whereby rotation of said shaft about its transverse axis rotates the jets of each bank simultaneously about their vertical axes, means associated with at least one of said transverse shafts for rotating the same at the will of the operator, and means for selectively connecting the first transverse shaft driven by the operator with a second transverse shaft of an adjacent movable frame whereby said second shaft and its associated jets may be rotated simultaneously with said first shaft.

References Cited in the file of this patent

UNITED STATES PATENTS 2,597,131     Sempos _____ May 20, 1952

FOREIGN PATENTS 18,218     Great Britain _____ 1912